United States Patent
Yano et al.

(10) Patent No.: US 8,669,935 B2
(45) Date of Patent: Mar. 11, 2014

(54) OPERATION DEVICE

(75) Inventors: Ken Yano, Tokyo (JP); Takamasa Araki, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 574 days.

(21) Appl. No.: 12/876,660

(22) Filed: Sep. 7, 2010

(65) Prior Publication Data

US 2011/0316770 A1 Dec. 29, 2011

(30) Foreign Application Priority Data

Sep. 17, 2009 (JP) ................................. 2009-215489

(51) Int. Cl.
*G09G 5/00* (2006.01)
*A63F 13/00* (2006.01)

(52) U.S. Cl.
USPC ............................................ 345/156; 463/36

(58) Field of Classification Search
USPC ................. 463/36, 37, 38; 345/173, 178, 157
See application file for complete search history.

(56) References Cited

U.S. PATENT DOCUMENTS

| | | | |
|---|---|---|---|
| 6,186,896 B1 * | 2/2001 | Takeda et al. ................... | 463/38 |
| 6,231,444 B1 | 5/2001 | Goto et al. | |
| 6,392,613 B1 | 5/2002 | Goto | |
| 6,617,982 B1 | 9/2003 | Ogata | |
| 2005/0233808 A1 * | 10/2005 | Himoto et al. ................... | 463/37 |
| 2006/0097453 A1 | 5/2006 | Feldman | |
| 2008/0015017 A1 | 1/2008 | Ashida | |

FOREIGN PATENT DOCUMENTS

| | | | |
|---|---|---|---|
| CN | 2416935 Y | 1/2001 | |
| JP | 5094967 U | 12/1993 | |
| JP | 11176517 | 7/1999 | |
| JP | 11239670 A | 9/1999 | |
| JP | 2008212701 * | 9/2008 | ............. A63F 13/06 |
| JP | 2008212701 A | 9/2008 | |
| JP | 4255510 B1 | 4/2009 | |
| JP | 2009110351 A | 5/2009 | |
| WO | 2006090197 A1 | 8/2006 | |

OTHER PUBLICATIONS

Office Action for corresponding Chinese Patent Application No. 201010282998.0, dated Nov. 5, 2012.
International Search Report for corresponding PCT Application PCT/JP2010/066214, dated Nov. 2, 2010.

(Continued)

*Primary Examiner* — Michael Faragalla
(74) *Attorney, Agent, or Firm* — Matthew B. Dernier, Esq.; Gibson & Dernier LLP (57) ABSTRACT

To provide an operation device for use by a user by holding in one hand, comprising a thumb operating area defined on a surface of the enclosure of the operation device, where an operation member to be operated by the user, using his/her thumb, while holding the operation device is provided; an inclination operation member including a stick part projecting from the thumb operating area, for being operated by the user by inclining the stick part, using the thumb; and an operation button provided on the surface of the enclosure in a position opposed to the thumb operating area, being capable of being pressed by the user, using another finger, in a direction intersecting a direction toward the inclination operation member.

17 Claims, 10 Drawing Sheets

(56) References Cited

OTHER PUBLICATIONS

International Preliminary Report on Patentability and Written Opinion for corresponding PCT Application PCT/JP2010/066214, dated Apr. 19, 2012.
Office Action for corresponding Japanese Patent Application No. 2011-531982, dated Feb. 5, 2013.
Office Action for corresponding Chinese Patent Application No. 201010282998.0, dated Jul. 10, 2013.
Search report for corresponding European Patent Application No. 10009712.0, dated Oct. 15, 2013.
Office Action for corresponding Japanese Patent Application No. 2011-531982, dated Oct. 24, 2013.

* cited by examiner

OPERATION DEVICE

BACKGROUND OF THE INVENTION

1. Field of the Invention

The present invention relates to an operation device for use by a user by holding in one hand.

2. Description of the Related Art

A variety of operation devices have been proposed as an operation device for use to operate an information processing device. Some of such operation devices, such as a controller of a consumer game device, are used by a user by holding in his/her hand. For example, Patent Document 1 discloses an operation device having two grip portions to be griped by a user with his/her both hands, an analog stick and a button capable of being operated by both thumbs, and a button capable of being operated by index or middle fingers of both hands.

2. Prior Art Document

Patent Document 1: U.S. Pat. No. 6,231,444 B1

SUMMARY OF THE INVENTION

Problems to be Solved by the Invention

Some of such operation devices are operated by a user as being held in one hand. In this case, a finger for use in inputting an operation tends to be limited to a particular one, such as a thumb, an index finger, or the like. Meanwhile, various operation members, including an inclination operation member, such as an analog stick or the like, and other buttons, may be required to be provided on the surface of the enclosure of an operation device in order to realize various operation inputs. In order to operate such an operation device with one hand, a user needs to move a particular finger (e.g., a thumb) in a relatively wide range to operate a plurality of operation members. In particular, with an inclination operation member included in such operation members, a user may need to change the posture of his/her thumb in various manners in addition to moving the thumb in a wide range in order to carry out an operation of inclining the inclination operation member. However, moving a thumb in various manners in a wide range as described above may cause it difficult to operate other operation members with other fingers, depending on the posture or position of the thumb.

The present invention has been conceived in view of the above described situation and one of the objects thereof is to provide an operation device for enabling a user to readily operate a plurality of kinds of operation members when using the operation device while holding in one hand.

Means for Solving the Problems

An operation device according to an embodiment of the present invention is an operation device for use by a user by holding in one hand, comprising: a thumb operating area defined on a surface of an enclosure of the operation device, where an operation member to be operated by the user, using his/her thumb, while holding the operation device is provided; an inclination operation member including a stick part projecting from the thumb operating area, for being operated by the user by inclining the stick part, using the thumb; and an operation button provided on the surface of the enclosure in a position opposed to the thumb operating area, being capable of being pressed by the user, using another finger, in a direction intersecting a direction toward the inclination operation member.

DETAILED DESCRIPTION OF THE INVENTION

In the following, an embodiment of the present invention will be described in detail with reference to the accompanying drawings.

[Outline of Information Processing System]

Figure 1:
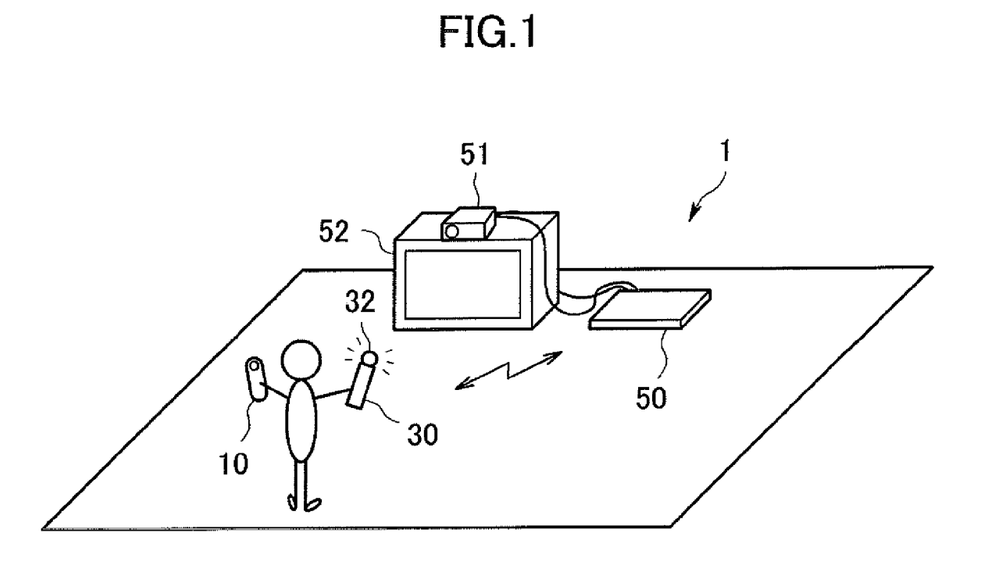
FIG. 1 is a schematic diagram of an information processing system including an operation device according to an embodiment of the present invention.

FIG. 1 is a schematic diagram showing a complete information processing system 1 including an operation device according to an embodiment of the present invention. In an embodiment of the present invention, the information processing system 1 comprises two operation devices including a first operation device 10 and a second operation device 30 and an information processing device 50. The first operation device 10 and the second operation device 30 are used by a user as each being held by the user in one hand to carry out an operation input relative to the information processing device 50. The information processing device 50 may be, e.g., a video game console, a personal computer, and so forth, and connected to the image capturing device 51 and the display device 52.

The first operation device 10 and the second operation device 30 can be connected for communication to the information processing device 50 via a radio communication interface in accordance with Bluetooth standard or the like. While holding either one of the first operation device 10 and the second operation device 30 in one hand, a user of the information processing system 1 operates an operation member provided to the operation device. Accordingly, information describing the content of an operation is sent via the radio communication interface to the information processing device 50. A user may carry out an operation input relative to the information processing device 50 through combination of the first operation device 10 and the second operation device 30 while holding the two operation devices each in each hand.

In this embodiment, the second operation device 30 has a light emitter 32 for emitting light in response to an instruction from the information processing device 50. Light from the light emitter 32 is captured by the image capturing device 51 into an image and the information processing device 50 analyzes the captured image, whereby the position of the second operation device 30 viewed from the image capturing device 51 is specified. With the above, a user can carry out an input operation relative to the information processing device 50 not only by operating an operation member provided to the second operation device 30 but also by moving the second operation device 30 itself.

[First Operation Device]

In the following, a structure of the first operation device 10 in this embodiment will be described.

Figure 2:
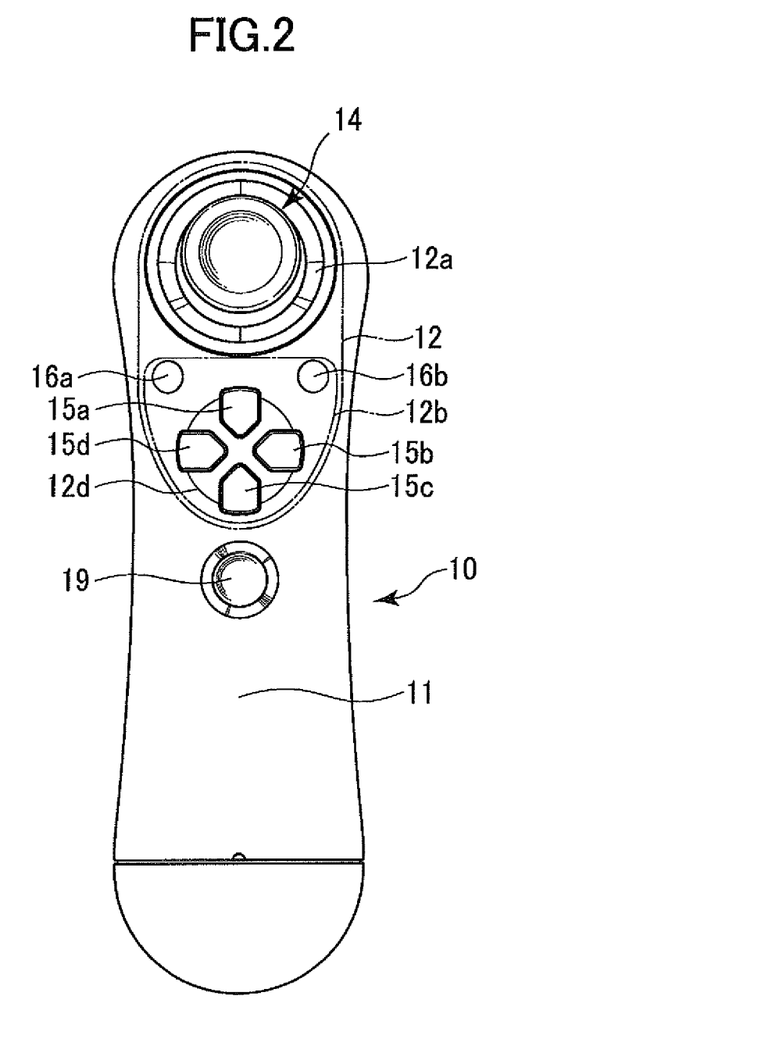
FIG. 2 is a front view of a first operation device.
Figure 3:
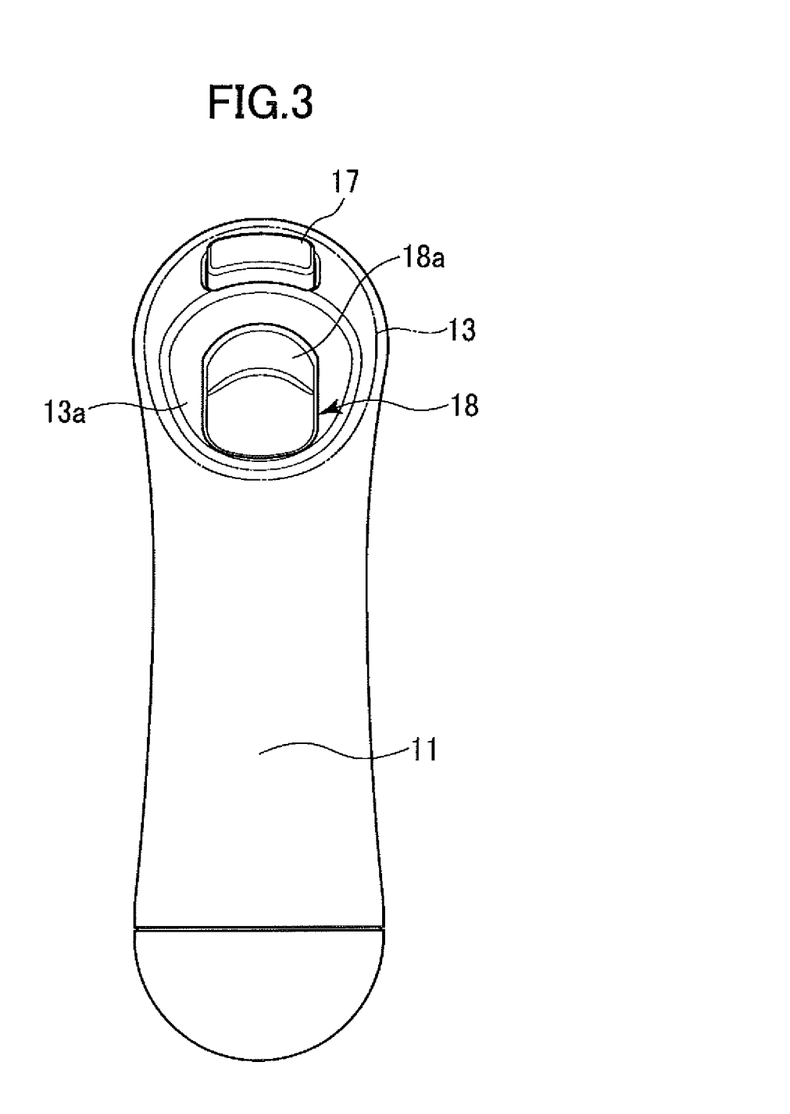
FIG. 3 is a rear view of the first operation device.
Figure 4:
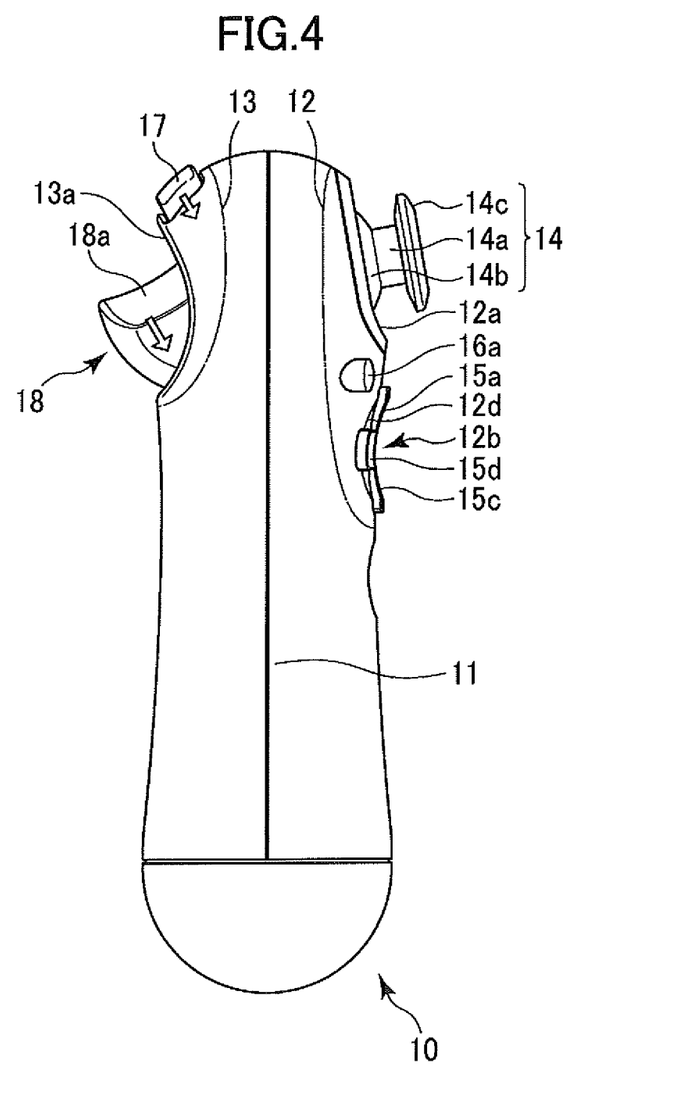
FIG. 4 is a left side view of the first operation device.
Figure 5:
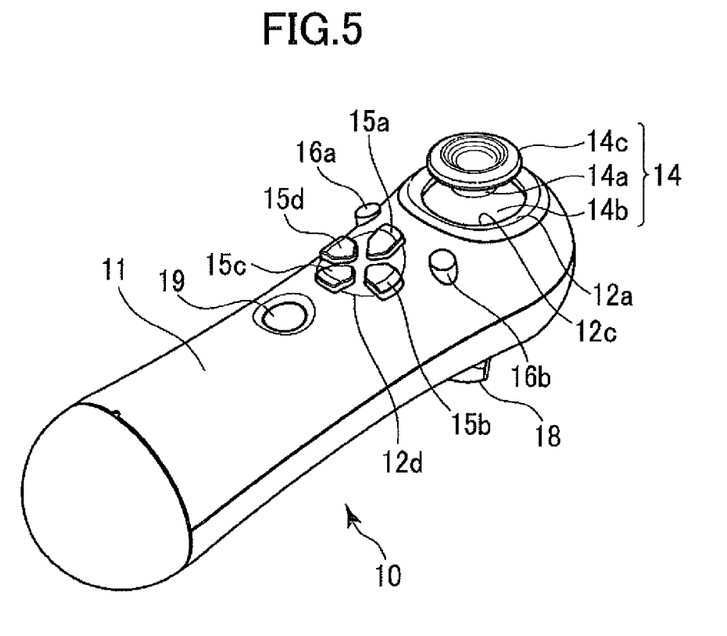
FIG. 5 is a perspective view of the first operation device viewed from the front.
Figure 6:
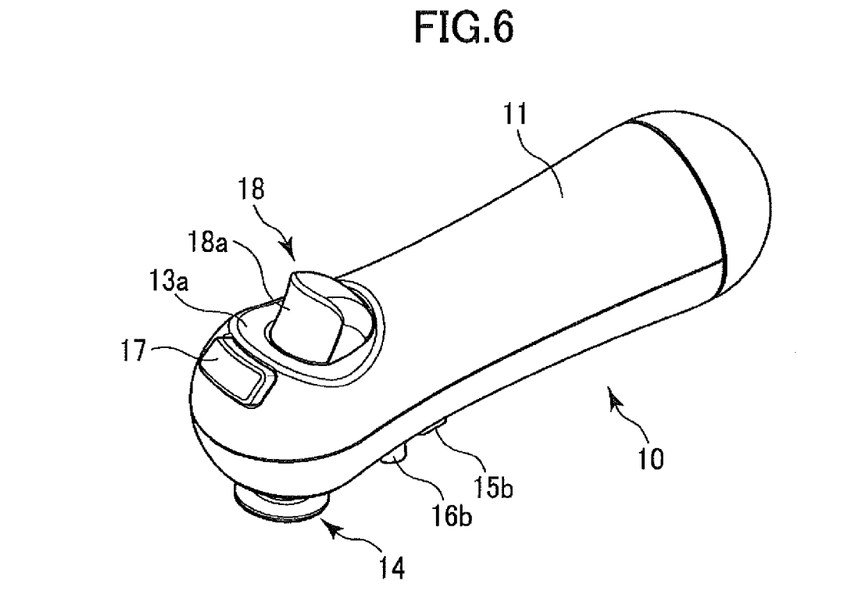
FIG. 6 is a perspective view of the first operation device viewed from the back.
Figure 7:
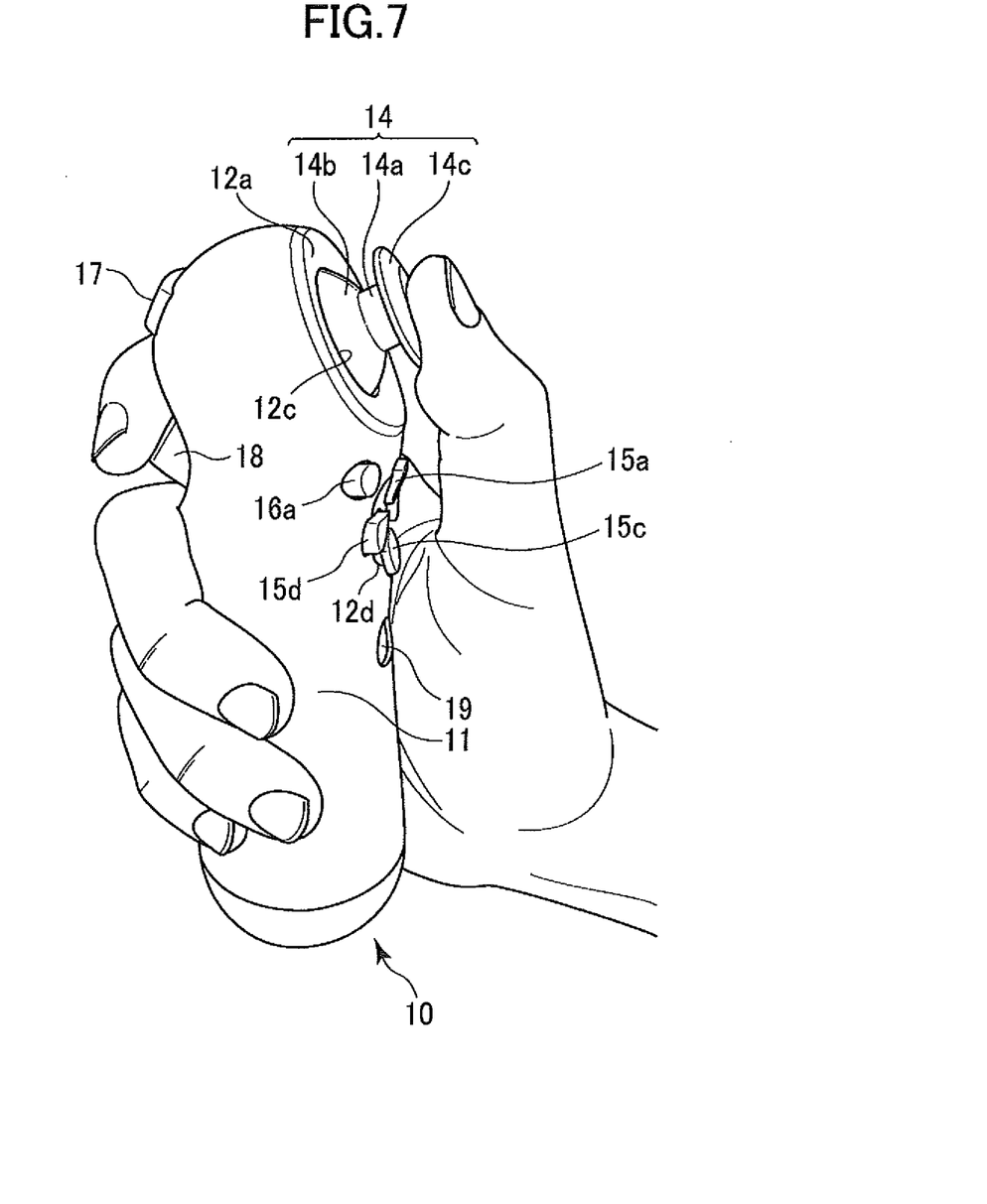
FIG. 7 is a diagram showing the first operation device held by a user.

FIGS. 2 to 6 are diagrams showing an external appearance of the first operation device 10, in which FIG. 2 is a front view of the first operation device 10, FIG. 3 is a rear view thereof, FIG. 4 is a left side view, FIG. 5 is a perspective view viewed from the front, and FIG. 6 is a perspective view viewed from the back. FIG. 7 is a diagram showing the first operation device 10 held by a user in one hand. Note that, although the first operation device 10 is held by a user in his/her right hand in FIG. 7, a user may hold the first operation device 10 in his/her left hand instead.

As shown in these diagrams, the enclosure of the first operation device 10 has a cylindrical shape as a whole, being slightly curved inward as it goes toward the middle part in the longitudinal direction thereof. The upper and lower ends of the first operation device 10 are formed semi-spherical. A throughout hole is formed in a position near the lower end of the first operation device 10 for a strap or the like to pass therethrough.

The lower part of the enclosure of the first operation device 10 constitutes a grip portion 11 to be gripped by a user when carrying out an operation input, and an operation member is provided on the upper part of the enclosure of the first operation device 10 for use by a user to carry out various input operations while gripping the grip portion 11. A user, while holding the grip portion 11 with his/her palm and finger, such as a little finger, carries out an operation input relative to the various operation members provided on the lateral surface of the enclosure of the first operation device 10, using his/her thumb, index finger, or the like.

Specifically, a thumb operating area 12 is defined on the front side of the upper part of the enclosure of the first operation device 10. The thumb operating area 12 occupies a long area extending in the longitudinal direction of the first operation device 10 on the front side of the enclosure of the first operation device 10. Various operation members are provided in the thumb operating area 12, which are to be operated by a user using his/her thumb, while holding the grip portion 11. In addition, a rear operation area 13 is provided on the rear side of the upper part of the enclosure of the first operation device 10 so as to be opposed to the thumb operating area 12. An operation member is provided in the rear operation area 13, which is to be operated by a user using mainly his/her index and/or middle finger while holding the grip portion 11.

In the following, an operation member provided in the thumb operating area 12 will be described in detail.

As shown in FIG. 2, the thumb operating area 12 includes a first partial area 12a and a second partial area 12b arranged in the up-down direction. The first partial area 12a is positioned in the upper half (that is, on the opposite side from the grip portion 11) of the thumb operating area 12, while the second partial area 12b is positioned in the lower half (that is, on the side of the grip portion 11) of the thumb operating area 12. The second partial area 12b is smoothly connected to an adjacent part of the surface of the enclosure of the first operation device 10 (that is, a part outside the thumb operating area 12, which surrounds the second partial area 12b).

Meanwhile, the first partial area 12a is a round area formed by diagonally cutting off the lateral surface on the upper end side of the cylinder constituting the enclosure of the first operation device 10, constituting a surface inclined toward the inside of the enclosure of the first operation device 10 relative to the second partial area 12b. That is, the first partial area 12a and the second partial area 12b are positioned adjacent to each other so as to together form an obtuse angle when viewed from the lateral side of the first operation device 10, as shown in FIG. 4. Further, a round hole 12c is formed at the center of the first partial area 12a, with a part surrounding the hole 12c, being formed descending toward the hole 12c, like a mortar, relative to a part outside the first partial area 12a.

In the first partial area 12a, an inclination operation member 14 is provided so as to stand through the hole 12c. Specifically, the inclination operation member 14 comprises a semi-spherical base 14b of which upper portion projects out of the hole 12c, a stick (cylindrical) arm portion 14a standing from the base 14b, and a disk-like head portion 14c attached to the top end of the arm portion 14a and having a diameter larger than that of the arm portion 14a. The surface of the head portion 14c is formed slightly receding toward the side of the arm portion 14a, as shown in FIG. 5. The arm portion 14a in the reference state (a state with no force externally applied) is kept in a posture substantially perpendicular relative to the surface of the first partial area 12a and is adapted to inclination in any direction of 360° directions within a range defined by the hole 12c with the base 14b as a rotation center.

A user, with his/her thumb put on the receding part of the surface of the head portion 14c, puts force onto the head portion 14c with the thumb in a direction in parallel to the surface of the first partial area 12a to thereby incline the arm portion 14a in any direction, such as up, down, left, right, or diagonal direction. With the above, a user can carry out an operation input to designate a direction. Note that the inclination operation member 14 is an analog stick capable of determining (or producing an output as a function of) an amount of inclination (an inclination angle) of the arm portion 14a relative to itself in the reference state. With the above, a user can carry out an analog operation input in accordance with not only an inclination direction but also an inclined amount by inclining slightly or largely the inclination operation member 14.

In addition, the inclination operation member 14 is adapted to click operation of being pressed as a whole in a direction perpendicular to the surface of the first partial area 12a. With the above, when a user puts power in his/her thumb placed on the head portion 14c to thereby press the head portion 14c toward the enclosure of the first operation device 10, the inclination operation member 14 can be used as a whole as a press button.

In the central area of the second partial area 12b, a substantially round recess 12d is formed with four direction designation buttons 15a to 15d provided along the outer circumference thereof. Specifically, a direction designation button 15a is provided in an upper portion of the recess 12d; a direction designation button 15b is provided on a right portion of the recess 12d when viewed from the front of the first operation device 10; a direction designation button 15c is provided in a lower portion of the recess 12d; and a direction designation button 15d is provided on a left portion of the recess 12d when viewed from the front.

These four direction designation buttons 15a to 15d are used by a user in designating a direction. That is, the four direction designation buttons 15a to 15d correspond to the respective directions viewed from the center of the recess 12d, and a user presses one or two or more of these direction designation buttons 15a to 15d simultaneously to thereby designate a direction. For example, a user presses the direction designation button 15a to designate the upper direction, the direction designation button 15b to designate the rightward direction, and the direction designation buttons 15c and 15d simultaneously to designate the lower leftward direction.

Note that each of the direction designation buttons 15a to 15d has a pentagonal shape as a whole when viewed from the front of the first operation device 10, the pentagonal shape being formed by combining a quadrate and an isosceles triangle, with a vertex of the isosceles triangle directed to the center of the recess 12d. The side of each pentagonal shape opposite from the vertex (on the opposite side from the center of the recess 12d) is formed arc so as to accord with the shape of the recess 12d. Moreover, each of the direction designation buttons 15a to 15d is formed so as to accord with the shape of the recess 12d, specifically, being lowered in height toward the center of the recess 12d. This enables a user to detect the central position of the recess 12d without visually checking the positions of the direction designation buttons 15a to 15d by merely touching with his/her thumb any of the direction designation buttons 15a to 15d and moving the thumb in a direction with the height being lowered. Further, a user can press a desired button of the direction designation buttons 15a to 15d merely by slightly moving his/her finger from the central position of the recess 12d.

As described above, the first operation device 10 has two kinds of operation members as operation input means for use by a user to designate a direction, including the inclination operation member 14 and the direction designation buttons 15a to 15d, both provided in the thumb operating area 12. Therefore, a user, while using either one of the operation members which, e.g., he/she favors, can carry out an input operation to designate a direction in a manner he/she likes. Moreover, a user may desirably use any of these operation input means, depending on the content of an application program being carried out by the information processing device 50, so that the user can make a plurality of kinds of direction instructions with different objects addressed, such as e.g., movement of a user object and selection of a menu item.

Note that, as described above, the first partial area 12a where the inclination operation member 14 is provided is defined inclined toward inside of the enclosure of the first operation device 10 relative to the second partial area 12b where the direction designation buttons 15a to 15d are provided, and the inclination operation member 14 is provided so as to project, when being in the reference position, in a direction substantially perpendicular to the surface of the first partial area 12a. This enables a user to operate the inclination operation member 14, which projects from the enclosure of the first operation device 10, using his/her thumb in natural posture, that is, without bending the thumb back toward himself/herself or keeping his/her palm largely apart from the enclosure of the first operation device 10, differently from a case without such inclination. Moreover, as the direction designation buttons 15a to 15d are provided in the second partial area 12b defined between the inclination operation member 14 and the grip portion 11, an erroneous operation such that the direction designation buttons 15a to 15d are erroneously pressed by a user's palm or a part of the thumb near the root thereof while operating the inclination operation member 14 with the thumb placed on the head portion 14c of the inclination operation member 14 is unlikely to happen. Further, a user can designate a direction, using the direction designation buttons 15a to 16d, based on the same orientation as that when operating the inclination operation member 14, when merely moving his/her thumb directly downward from the position of the inclination operation member 14.

Two operation buttons 16a and 16b are additionally provided in the second partial area 12b. These operation buttons 16a and 16b are used in, e.g., entering a menu item selected using the inclination operation member 14 or the direction designation buttons 15a to 15d or instructing cancellation or the like. The operation buttons 16a and 16b are positioned symmetrical in the left and right direction when viewed from the front of the first operation device 10 in positions in the up-down direction between the upper end of the direction designation button 15a and the lower end of the first partial area 12a. The position in the left-right direction of the operation button 16a when viewed from the front of the first operation device 10 is slightly more leftward than the operation button 15d, and that of the operation button 16b is slightly more rightward than the operation button 15b. That is, a user can readily operate the operation buttons 16a and 16b when merely moving his/her thumb placed on the inclination operation member 14 in a right downward or left downward direction or from a position near the center of the direction designation buttons 15a to 15d in a right upward or left upward direction.

In the following, an operation member provided in the rear operation area 13 will be described.

In the rear operation area 13, two operation buttons 17 and 18 are provided. Specifically, a substantially rectangular operation button 17 is provided in an upper part of the rear operation area 13. As shown in FIG. 4, the operation button 17 is positioned near the upper end of the first operation device 10 so as to project diagonally upward. The operation button 17 is an analog button capable of determining (or producing an output as a function of) an amount by which a user presses the operation button 17. Note that the direction in which the operation button 17 is pressed is indicated by the block arrow in FIG. 4.

A concave 13a is defined in a lower part of the rear operation area 13, which is formed by cutting off the enclosure of the first operation device 10 so as to have an arc shape when viewed from the lateral side. An operation button 18 is provided in a relatively lower part of the concave 13a. Specifically, the operation button 18 is provided so as to be entirely covered by an area on the rear side, opposed to the thumb operating area 12 when viewed from the lateral side of the first operation device 10. Further, the operation button 18 is provided in a position in the length direction of the first operation device 10, which strides across a position opposed to the boundary between the first partial area 12a and the second partial area 12b.

The operation button 18 has a shape projecting to be triangular when viewed from the lateral side of the first operation device 10 relative to the concave 13a, as shown in FIG. 4. A user presses the operation button 18 downward with his/her index finger (or middle finger) placed on the surface 18a facing upward of the operation button 18, as shown in FIG. 7. With this operation, the operation button 18 is pressed diagonally downward to thereby rotate with the upper end thereof as a substantial rotation axis. In FIG. 4, the pressing direction is indicated by the block arrow. Note that, similar to the operation button 17, the operation button 18 is an analog button capable of determining (or producing an output as a function of) an amount by which a user presses the operation button 18.

As shown in FIG. 4, the pressing direction of the operation button 18 is substantially in parallel to that of the operation button 17. That is, the pressing direction of either operation button is a direction extending toward the grip portion 11 and a direction intersecting a direction extending from the respective operation button to the inclination operation member 14. In particular, the pressing direction of the operation button 18 is a direction substantially orthogonal to the direction from the operation button 18 to the inclination operation member 14, that is, a direction forming an angle smaller than 45° relative to the surface of the enclosure of the first operation device 10 where the operation button 18 is provided (that is, a direction closer to a direction in parallel to the surface of the enclosure rather than a direction orthogonal to the surface). With the above, the arm portion 14a in the reference position extends along a straight line extending from the operation button 18 to the inclination operation member 14, and therefore, the pressing direction of the operation button 18 intersects the direction in which the arm portion 14a extends even however the arm portion 14a is inclined. Note that, even when the pressing direction of the operation button 18 is not orthogonal to the direction in which the arm portion 14a in the reference state extends, as long as the pressing direction of the operation button 18 intersects the direction in which the arm portion 14a in the reference state extends so as to form an angle at least larger than the maximum inclination angle (e.g., 45°) of the arm portion 14a, it is possible to press the operation button 18 in a direction intersecting the direction in which the arm portion 14a extends even however the arm portion 14a is inclined.

Here, for example, while a user is carrying out an operation of inclining the operation member 14 with his/her thumb, the user can hardly put power toward the side of the thumb (e.g., in a direction toward the inclination operation member 14), using his/her index finger, or the like. However, in this embodiment, as the operation buttons 17 and 18 are both to be pressed in a direction intersecting the direction from the respective operation button to the inclination operation member 14, a user can readily operate the operation buttons 17 and 18 while carrying out an operation of inclining the inclination operation member 14 with his/her thumb. In this embodiment in particular, as the operation buttons 17 and 18 can be pressed in a direction toward the grip portion 11, a user can stably put force on the operation buttons 17 and 18. In addition, as the operation buttons 17 and 18 are analog buttons, as described above, to be readily put power on in this embodiment, a user can readily make fine adjustment in the amount to press by pressing lightly or deeply the operation buttons 17 and 18. In addition, as the operation buttons 17 and 18 are provided on the rear side in a position opposed to the thumb operating area 12, a user can readily operate the operation buttons 17 and 18 while operating any of the operation members, such as the inclination operation member 14, the direction designation buttons 15a to 15d, and so forth, provided in the thumb operating area 12, using his/her thumb.

A power button 19 is provided on the surface of the enclosure of the first operation device 10 below the thumb operating area 12. The power button 19 is used to power on the first operation device 10 to start operating or turn off to end the operation. That is, different from the other buttons, the power button 19 is not usually operated while the information processing device 50 is executing an application program or the like.

Note that the inclination operation member 14, the central position of the direction designation buttons 15a to 15d, and the power button 19 are arranged in a straight line in the up-down direction along the central line in the left-right direction of the first operation device 10 when viewed from the front. Accordingly, the direction designation buttons 15a and 15c for use in designating the up and down directions are provided on the central line.

As described above, when holding the first operation device 10 in one hand, a user can readily operate the operation buttons 17 and 18 with his/her finger, such as, an index finger, a middle finger, or the like, other than the thumb, while carrying out an operation input using various operation members, including the inclination operation member 14, with his/her thumb. In addition, a user can press the operation buttons 17 and 18 while desirably adjusting the amount of force to put even while carrying out an operation of inclining the inclination operation member 14.

[Second Operation Device]

In the following, a structure of a second operation device 30 will be described.

Figure 8:
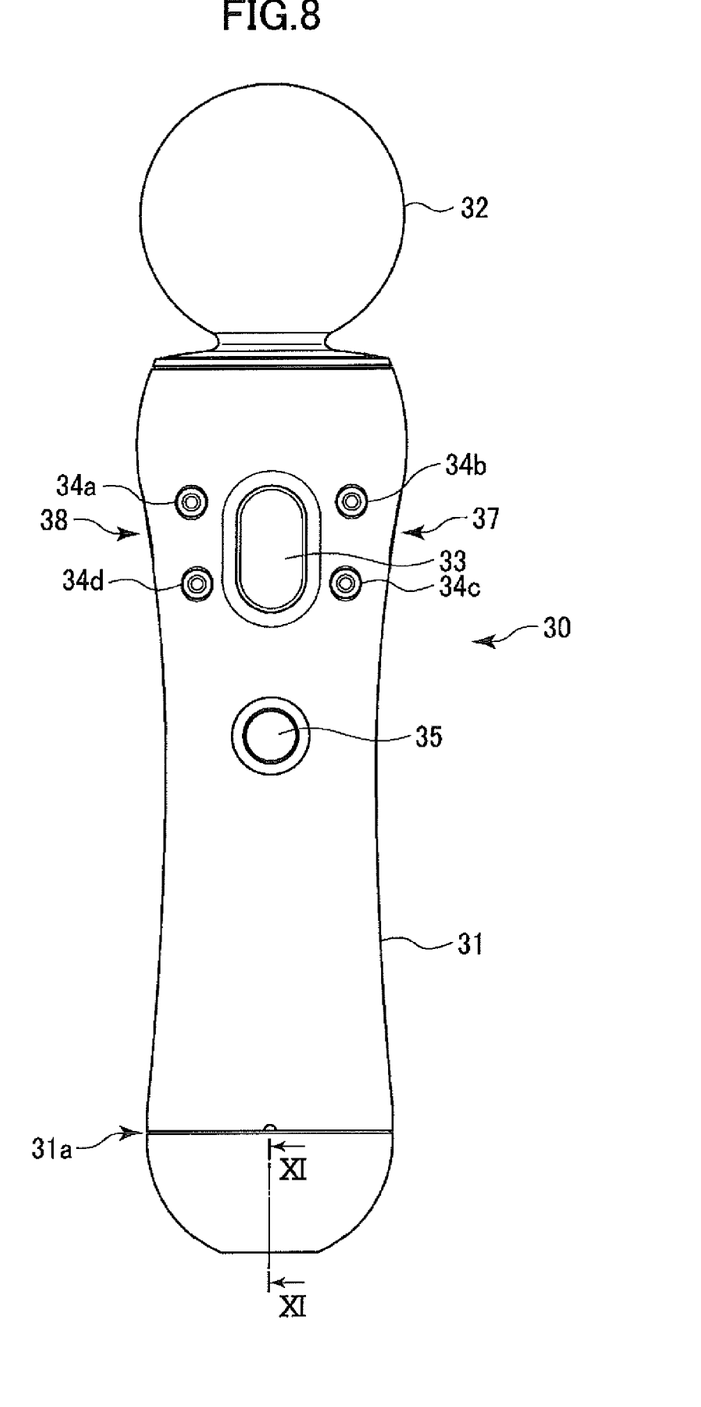
FIG. 8 is a front view of a second operation device.
Figure 9:
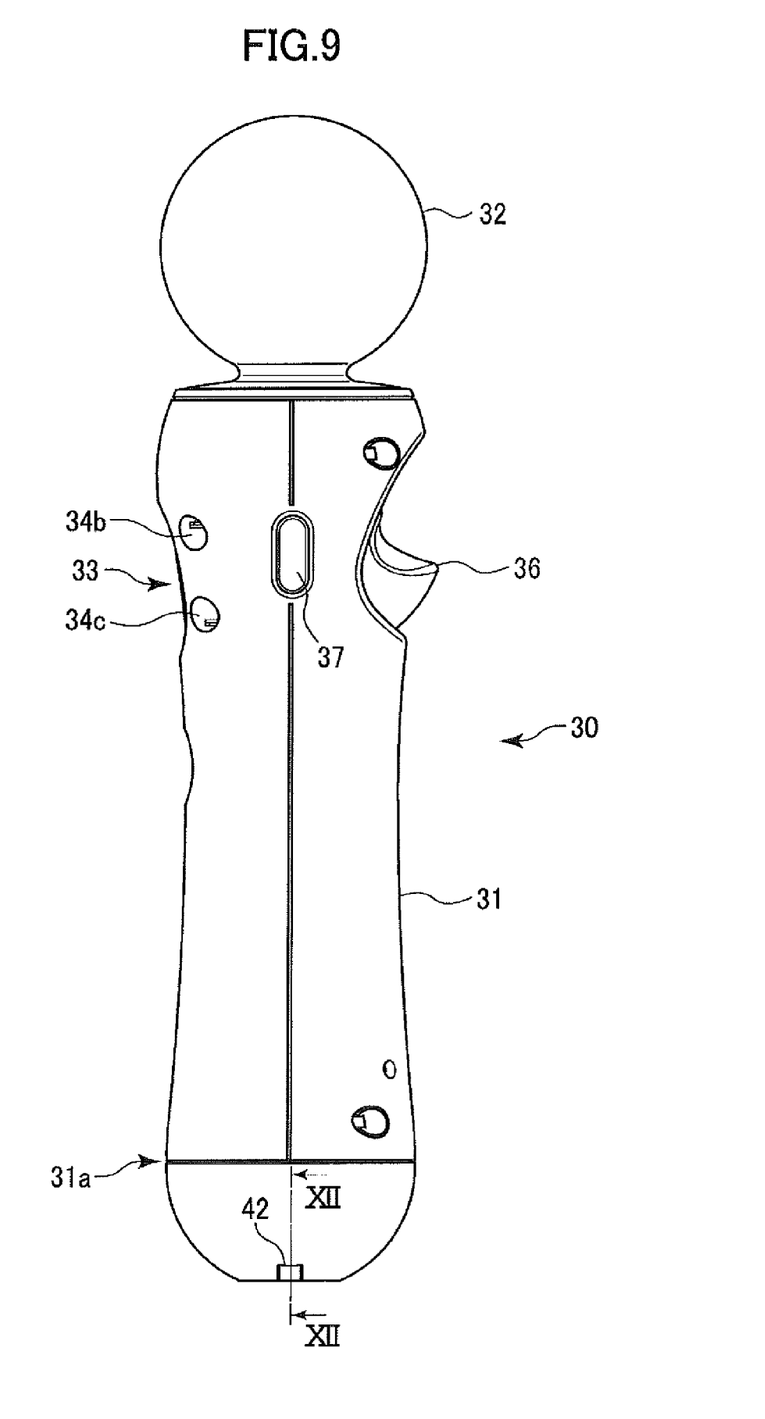
FIG. 9 is a left side view of the second operation device.
Figure 10:
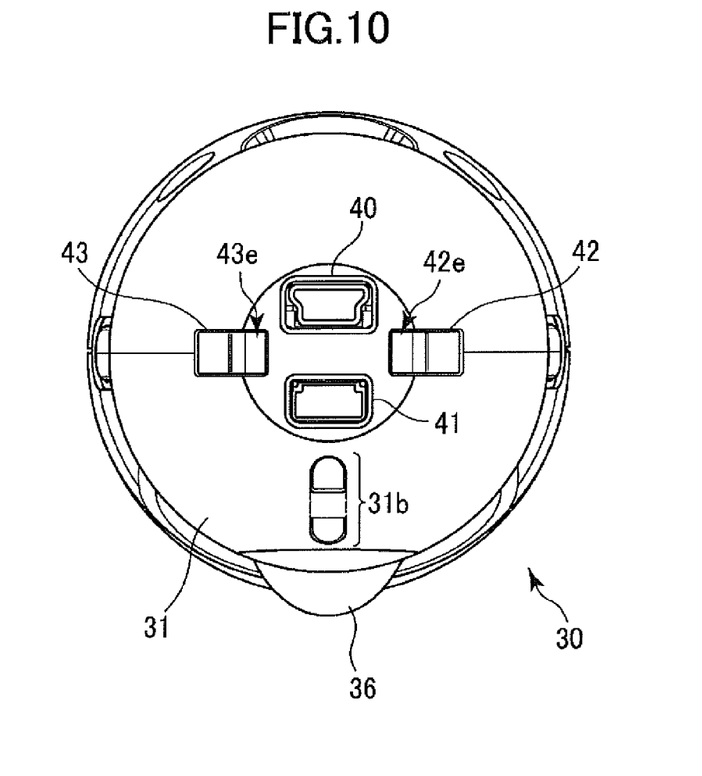
FIG. 10 is a bottom view of the second operation device.
Figure 11:
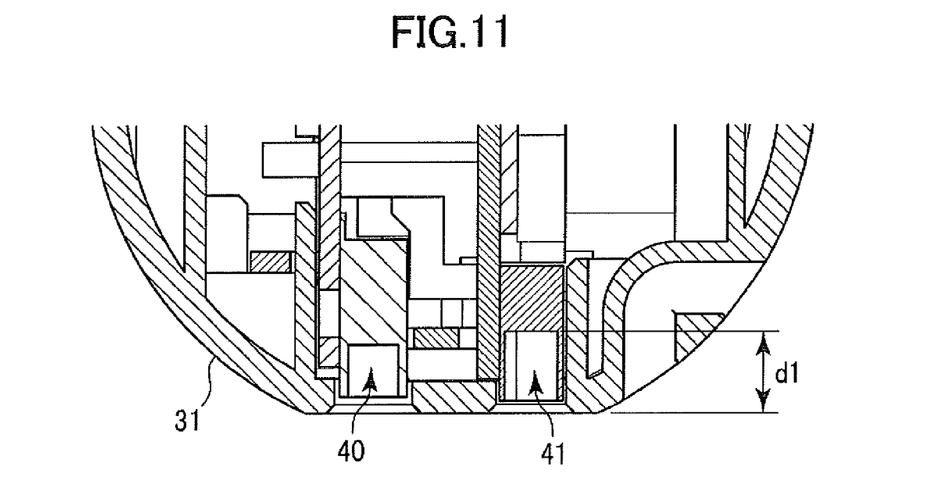
FIG. 11 is an enlarged partial cross sectional view of the second operation device taken from line XI-XI in FIG. 8.
Figure 12:
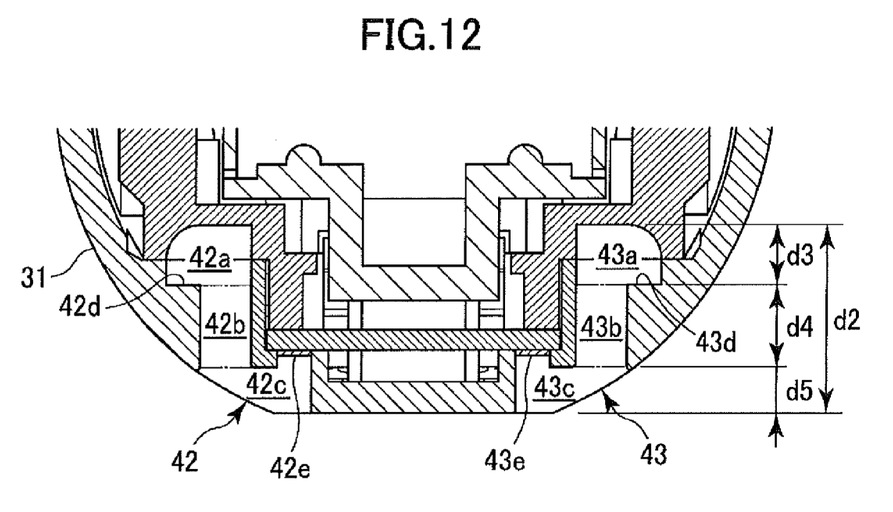
FIG. 12 is an enlarged partial cross sectional view of the second operation device taken from line XII-XII in FIG. 9.

FIGS. 8 to 12 are diagrams showing external appearance of the second operation device 30, in which FIG. 8 is a front view of the second operation device 30, FIG. 9 is a left side view thereof, and FIG. 10 is a bottom view thereof. FIG. 11 is an enlarged partial cross sectional view of the second operation device 30 taken from line XI-XI in FIG. 8, and FIG. 12 is an enlarged partial cross sectional view of the second operation device 30 taken from line XII-XII in FIG. 9.

As shown in these diagrams, the second operation device 30 comprises a main body 31, a light emitter 32, and a plurality of buttons formed on the surface of the main body 31. While holding the main body 31, a user presses the respective buttons with his/her finger to carry out an operation input.

The main body 31 is formed cylindrical as a whole, being slightly curved inward as it goes toward the middle part thereof in the longitudinal direction. The upper end of the main body 31 is formed as a flat surface where the light emitter 32 is provided. Meanwhile, the lower end (a bottom side of the second operation device 30) is formed substantially semi-spherical with a flat tip end. A groove 31a is formed along the boundary between the semi-spherical portion formed on the lower end side of the main body 31 and the body part of the main body 31. The groove 31a is formed annular around the lateral surface of the main body 31 in the width direction of the second operation device 30. A throughout hole 31b is formed near the lower end of the second operation device 30 for a strap or the like to pass therethrough.

The light emitter 32 comprises a spherical outer shell made of light transmitting material, such as silicone resin or the like, and a plurality of LED's provided inside the shell. In this embodiment, three LED's corresponding to the respective three primary colors of light respectively emit light with intensity instructed by the information processing device 50, whereby the light emitter 32 emits light in various colors. The image capturing device 51 captures the light from the light emitter 32 into an image, and the information processing device 50 specifies the direction relative to the image capturing device 51, in which the second operation device 30 is present. In addition, the distance from the image capturing device 51 to the second operation device 30 is calculated based on the size of the light from the light emitter 32, shown in the captured image. The information processing device 50 carries out various information processes according to the information about the direction and distance of the second operation device 30. With the above, a user can carry out an operation input relative to the information processing device 50 by holding and moving the second operation device 30 with his/her hand.

On the surface of the enclosure of the main body 31, a main button 33, auxiliary buttons 34a to 34d, and a power button 35 are provided on the front side; an analog button 36 is provided on the rear side; and a start button 37 and a select button 38 are provided on the lateral side. A user operates the power button 35 to power on the second operation device 30 to start operating or to power off to end the operation. In addition, while holding the main body 31, using the palm and a finger, such as a little finger, or the like, a user operates the main button 33, the auxiliary buttons 34a to 34d, the start button 37, and the select button 38, using his/her thumb, index finger, or the like, to carry out various operation inputs relative to the information processing device 50.

In this embodiment, a mini-B type USB connector 40 and an extension connector 41 are provided on the bottom surface of the second operation device 30, as shown in FIG. 10. A USB host device is to be connected to the USB connector 40 via a USB cable, and various extension devices are to be connected to the extension connector 41. The extension connector 41 is opened rectangular on the bottom surface of the second operation device 30, forming a hole having depth d1, as shown in FIG. 11. An extension device has a plug having a shape and height in accordance with the shape and depth of the extension connector 41, so that with the plug inserted in the extension connector 41, the extension device is thereby connected to the second operation device 30.

In addition, two to-be-engaged portions 42 and 43 are provided on the bottom surface of the main body 31 on the left and right sides, respectively, with the USB connector 40 and the extension connector 41 in-between. The two to-be-engaged portions 42 and 43 are engaged with two engagement portions provided to an extension device, respectively, when the extension device is connected to the second operation device 30. Each of the to-be-engaged portions 42 and 43 is a hole having a shape in accordance with the engagement portion, so that when engagement portions provided to an extension device are inserted in and engaged with the respective to-be-engaged portions 42 and 43, the extension device is thereby fixed to the second operation device 30.

Specifically, the to-be-engaged portion 42 is formed including a prong storage 42a formed deepest inside thereof, a guide portion 42b formed in a middle part thereof, an opening 42c formed in a part closer to the outside (on the bottom surface side of the second operation device 30). The guide portion 42b is formed extending straight in the longitudinal direction of the second operation device 30. The prong storage 42a is formed expanding more toward outside of the second operation device 30 than the guide portion 42b. With a prong formed on the tip end of an engagement portion of an extension device, being hooked on the surface 42d on the bottom surface side of the expanded portion, the engagement portion is engaged with the to-be-engaged portion 42.

The opening 42c is formed extending more toward inside of the second operation device 30 than the guide portion 42b. As a result, the to-be-engaged portion 42 is formed opened on the bottom surface of the second operation device 30, being wider in a part near the opening on the bottom surface than the guide portion 42b. A power terminal 42e is provided on the deepest surface of the extended portion, for use in charging the second operation device 30. Specifically, the power supply terminal 42e is exposed, as shown in FIG. 10, when viewed from the bottom surface side of the second operation device 30.

A to-be-engaged portion 43 is provided symmetrical in the left-right direction relative to the to-be-engaged portion 42 with the central line in the left-right direction of the second operation device 30 as a symmetrical axis. That is, the to-be-engaged portion 43 as well is formed including a prong storage 43a, a guide portion 43b, and an opening 43c. The prong storage 43a is formed expanding more toward outside of the second operation device 30 than the guide portion 43b so that a prong provided on the tip end of an engagement portion of an extension device is hooked on the surface 43d on the bottom surface side of the expanded portion. In addition, the opening 43c is formed extending more toward inside of the second operation device 30 than the guide portion 43b, and a power terminal 43e is provided on the deepest surface of the extended portion, for use in charging the second operation device 30. In charging the second operation device 30, the connection terminals of a charger contact the power terminals 42e and 43e so that power is supplied from the charger via the power terminals 42e and 43e to the second operation device 30.

As shown in FIG. 12, the depth of the entire to-be-engaged portion 42, 43 is depth d2; that of the prong storage 42a, 43a is depth d3; that of the guide portion 42b, 43b is depth d4; and that of the opening 42c, 43c is depth d5, in which d2=d3+d4+d5 is held. The depth d2 of the to-be-engaged portion 42, 43 corresponds to the length of an engagement portion (the length of a part of an engagement portion, projecting from the body of the extension device) provided to an extension device; the depth d3 of the prong storage 42a, 43a corresponds to the length of a prong provided on the tip end of an engagement portion; the depth d5 of the opening 42c, 43c corresponds to the distance from the position of the opening of the extension connector 41 on the bottom surface of the second operation device 30 to the end of the guide portion 42b, 43b on the bottom surface side of the second operation device 30.

In this embodiment, the depth d2 of the to-be-engaged portion 42, 43 is larger than the depth d1 of the extension connector 41, and accordingly, on an extension device side, the engagement portion to be engaged with the to-be-engaged portion 42, 43 is longer than the plug to be inserted in the extension connector 41. Therefore, in connecting an extension device to the second operation device 30, the engagement portions begin being inserted into the to-be-engaged portion 42, 43 earlier than the plugs beginning being inserted into the extension connectors 41.

In this embodiment, (d3+d5)<(d2−d1) is held, in which d2−d1 corresponds to the distance from the tip end of the plug of an extension device to the tip end of the engagement portion. With the distance being longer than the total of the depth d3 of the prong storage 42a and the depth d5 of the opening 42c, the tip end of the plug does not contact the extension connector 41 until the prong on the tip end of the engagement portion is inserted inside the guide portion 42b, positioned deeper inside than the opening 42c.

Note that an embodiment of the present invention is not limited to the above described embodiment, and various modified embodiments are possible. For example, the shapes of the first operation device 10 and the second operation device 30 and the positions where the respective operation members are provided on the surface of the enclosure of each operation device may differ from those described above.

What is claimed is:

1. An operation device for use by a user by holding in one hand, comprising:

a thumb operating area defined on a surface of an enclosure of the operation device, where an operation member to be operated by the user, using his/her thumb, while holding the operation device is provided;

an inclination operation member including a stick part projecting from the thumb operating area, for being operated by the user by inclining the stick part, using the thumb; and a first operation button provided on the surface of the enclosure in a position opposed to the thumb operating area, being capable of being pressed by the user, using another finger, in a direction intersecting a direction toward the inclination operation member, wherein said thumb operating area comprises a first partial area and a second partial area, the first partial area includes an inclined surface which is inclined away from said second partial area, and the inclination operation member is formed in said first partial area and projects in a direction orthogonal to the inclined surface.

2. The operation device according to claim 1, wherein the first operation button is capable of being pressed in a direction toward a grip portion on the enclosure, which is gripped by the user, using a palm.

3. The operation device according to claim 1, wherein the first operation button is a button capable of producing an output as a function of an amount by which the user presses the operation button.

4. The operation device according to claim 1, wherein:
the thumb operating area is an area extending in a longitudinal direction of the enclosure,
the first partial area is defined on a side opposite from a grip portion on the enclosure to be gripped by the user, using a palm, and the second partial area is defined on a side of the grip portion, and
a direction designation button for use by the user to designate a direction is provided in the second partial area.

5. The operation device according to claim 4, wherein the first operation button is provided in a position opposed to a boundary position between the first partial area and the second partial area.

6. The operation device according to claim 1, wherein said operation device is narrower at a middle portion as compared to a front end and a back end of the device.

7. The operation device according to claim 1 wherein a second operation button is located below said inclination operation member on the elongated operation device outside of the thumb operating area.

8. The operation device according to claim 1, wherein a third operation button is positioned adjacent to the first operation button.

9. The operation device according to claim 7, wherein said second operation button is a power button.

10. The operation device according to claim 4, wherein the first partial area and the second partial area are linearly aligned with a lengthwise direction of the operation device.

11. The operation device according to claim 10, wherein said inclination operating member is located on said first partial area in between said second partial area and a top of said operation device.

12. The operation device according to claim 10, wherein said first partial area is inclined toward a top part of said operation device.

13. An operation device for use by a user by holding in one hand, comprising:
a thumb operating area defined on a surface of an enclosure of the operation device, where an operation member to be operated by the user, using his/her thumb, while holding the operation device is provided;
an inclination operation member including a stick part projecting from the thumb operating area, for being operated by the user by inclining the stick part, using the thumb; and
a first operation button provided on the surface of the enclosure in a position opposed to the thumb operating area, being capable of being pressed by the user, using another finger, in a direction intersecting a direction toward the inclination operation member,
wherein said thumb operating area has a first surface and a second surface, and wherein said first is surface is substantially not parallel with said second surface.

14. The operation device according to claim 13, wherein said inclination operating member is located on said first surface.

15. The operation device according to claim 14, wherein said first surface is inclined toward a top part of said operation device.

16. An operation device for use by a user by holding in one hand, comprising:
a thumb operating area defined on a surface of an enclosure of the operation device, where an operation member to be operated by the user, using his/her thumb, while holding the operation device is provided;
an inclination operation member including a stick part projecting from the thumb operating area, for being operated by the user by inclining the stick part, using the thumb;
a first operation button provided on the surface of the enclosure in a position opposed to the thumb operating area, being capable of being pressed by the user, using another finger, in a direction intersecting a direction toward the inclination operation member; and
a first direction designation button, a second direction designation button, a third direction designation button and a fourth direction designation button, each located in said thumb operating area,
wherein said first direction designation button, second direction designation button, third direction designation button and fourth direction designation button are positioned so as to be formed below the inclination operation member.

17. The operation device according to claim 16, wherein said first direction designation button, second direction designation button, third direction designation button and fourth direction designation button positioned so as to be in a cross-like pattern.

* * * * *